(12) United States Patent
Thom et al.

(10) Patent No.: US 10,938,560 B2
(45) Date of Patent: Mar. 2, 2021

(54) AUTHORIZATION KEY ESCROW

(71) Applicant: Microsoft Technology Licensing, LLC, Redmond, WA (US)

(72) Inventors: Stefan Thom, Snohomish, WA (US); Torsten Stein, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 15/629,086

(22) Filed: Jun. 21, 2017

(65) Prior Publication Data

US 2018/0375655 A1    Dec. 27, 2018

(51) Int. Cl.
*H04L 29/06* (2006.01)
*H04L 9/08* (2006.01)

(52) U.S. Cl.
CPC ............ *H04L 9/0897* (2013.01); *H04L 9/088* (2013.01); *H04L 9/0822* (2013.01); *H04L 9/0825* (2013.01); *H04L 9/0894* (2013.01); *H04L 63/0435* (2013.01); *H04L 63/0442* (2013.01); *H04L 63/061* (2013.01)

(58) Field of Classification Search
CPC ... H04L 9/0897; H04L 9/0825; H04L 9/0894; H04L 9/0822; H04L 9/088; H04L 63/0442; H04L 63/0435; H04L 63/061
See application file for complete search history.

(56) References Cited

U.S. PATENT DOCUMENTS

| | | | |
|---|---|---|---|
| 4,799,258 A | 1/1989 | Davies | |
| 5,343,527 A | 8/1994 | Moore | |
| 5,666,414 A | 9/1997 | Micali | |
| 5,799,086 A | 8/1998 | Sudia | |
| 6,118,874 A | 9/2000 | Okamoto et al. | |
| 6,141,423 A | 10/2000 | Fischer | |
| 6,253,193 B1 | 6/2001 | Ginter et al. | |
| 6,684,330 B1 * | 1/2004 | Wack | H04L 63/0428 713/162 |
| 6,976,163 B1 | 12/2005 | Hind et al. | |
| 7,257,844 B2 | 8/2007 | Woodward | |
| 7,350,072 B2 | 3/2008 | Zimmer et al. | |

(Continued)

FOREIGN PATENT DOCUMENTS

| | | |
|---|---|---|
| CA | 2597209 A1 | 10/2008 |
| CN | 106899583 A | 6/2017 |

(Continued)

OTHER PUBLICATIONS

Fotiou et al., "Securing Content Sharing over ICN", ACM-ICN '16: Proceedings of the 3rd ACM Conference on Information-Centric Networking, pp. 176-185, Sep. 2016.*

(Continued)

*Primary Examiner* — Morshed Mehedi
(74) *Attorney, Agent, or Firm* — Holzer Patel Drennan

(57) ABSTRACT

A key originating device generates a subject key that is managed by a policy. The subject key may be generated and the policy configured at the instruction of a user, an application, or a service, such as a provisioning service. The policy that manages the subject key identifies at least one or more entities that are authorized to receive the subject key. The subject key is provided varying layers of encryption as it is communicated between the originating device, an escrow services, and an authorized entity.

22 Claims, 10 Drawing Sheets

(56) References Cited

U.S. PATENT DOCUMENTS

| | | | |
|---|---|---|---|
| 7,350,083 | B2 | 3/2008 | Wells et al. |
| 7,499,551 | B1 | 3/2009 | Mire |
| 7,580,521 | B1 | 8/2009 | Spies et al. |
| 7,711,960 | B2 | 5/2010 | Scarlata |
| 8,041,957 | B2 | 10/2011 | Michaelis et al. |
| 8,200,988 | B2 | 6/2012 | Gass et al. |
| 8,259,948 | B2 | 9/2012 | Smith et al. |
| 8,578,153 | B2 | 11/2013 | Johansson et al. |
| 8,606,945 | B2 | 12/2013 | Merkow et al. |
| 8,621,218 | B2 | 12/2013 | Kwon et al. |
| 8,850,543 | B2 | 9/2014 | Von Bokern et al. |
| 8,903,370 | B2 | 12/2014 | Yerrabommanahalli et al. |
| 9,043,827 | B1 | 5/2015 | Rapoport et al. |
| 9,118,486 | B2 | 8/2015 | Pritikin |
| 9,235,696 | B1 | 1/2016 | Nien et al. |
| 9,306,913 | B1 | 4/2016 | Volkov |
| 9,419,951 | B1 | 8/2016 | Felsher et al. |
| 9,467,293 | B1 | 10/2016 | Brainard et al. |
| 10,652,245 | B2 * | 5/2020 | Brickell .......... H04L 9/14 |
| 2002/0093915 | A1 | 7/2002 | Larson |
| 2003/0084332 | A1 | 5/2003 | Krasinski et al. |
| 2003/0126439 | A1 | 7/2003 | Wheeler et al. |
| 2004/0127196 | A1 | 7/2004 | Dabbish et al. |
| 2006/0282901 | A1 | 12/2006 | Li et al. |
| 2007/0003064 | A1 * | 1/2007 | Wiseman .......... H04L 9/0825 380/281 |
| 2008/0066095 | A1 | 3/2008 | Reinoso |
| 2008/0069350 | A1 | 3/2008 | Reinoso et al. |
| 2008/0162947 | A1 | 7/2008 | Holtzman et al. |
| 2008/0215474 | A1 | 9/2008 | Graham |
| 2009/0044015 | A1 | 2/2009 | Gantman et al. |
| 2009/0208015 | A1 | 8/2009 | Kamat et al. |
| 2010/0266132 | A1 * | 10/2010 | Bablani .......... H04L 9/0894 380/286 |
| 2011/0179268 | A1 | 7/2011 | Strom et al. |
| 2012/0099727 | A1 | 4/2012 | Marshall et al. |
| 2012/0137137 | A1 | 5/2012 | Brickell et al. |
| 2012/0173885 | A1 | 7/2012 | Acar et al. |
| 2012/0255010 | A1 | 10/2012 | Sallam |
| 2012/0295618 | A1 | 11/2012 | Ahmavaara et al. |
| 2013/0091556 | A1 | 4/2013 | Horn et al. |
| 2013/0283381 | A1 | 10/2013 | Thadikaran et al. |
| 2014/0143412 | A1 | 5/2014 | Martinez perea et al. |
| 2014/0281485 | A1 * | 9/2014 | Ganesan .......... H04L 9/0825 713/153 |
| 2015/0019875 | A1 * | 1/2015 | Barbiero .......... G06F 21/602 713/189 |
| 2015/0052610 | A1 | 2/2015 | Thom et al. |
| 2015/0074402 | A1 | 3/2015 | D'souza et al. |
| 2015/0312041 | A1 | 10/2015 | Choi |
| 2015/0341791 | A1 * | 11/2015 | Yang .......... H04W 12/06 713/159 |
| 2016/0021635 | A1 | 1/2016 | Lee et al. |
| 2016/0044012 | A1 | 2/2016 | Carrer et al. |
| 2016/0054989 | A1 | 2/2016 | Diebolt et al. |
| 2016/0099969 | A1 | 4/2016 | Angus et al. |
| 2016/0205078 | A1 | 7/2016 | James et al. |
| 2016/0226870 | A1 | 8/2016 | Chiu et al. |
| 2016/0270020 | A1 | 9/2016 | Adrangi et al. |
| 2016/0294828 | A1 | 10/2016 | Zakaria |
| 2016/0330182 | A1 | 11/2016 | Jeon et al. |
| 2016/0342798 | A1 | 11/2016 | Smith et al. |
| 2016/0379220 | A1 | 12/2016 | Tunnell et al. |
| 2017/0005871 | A1 | 1/2017 | Smith et al. |
| 2017/0006003 | A1 | 1/2017 | Zakaria et al. |
| 2017/0024569 | A1 | 1/2017 | Xing et al. |
| 2017/0024570 | A1 | 1/2017 | Pappachan et al. |
| 2017/0063566 | A1 | 3/2017 | Seminario et al. |
| 2017/0063811 | A1 | 3/2017 | Hitchcock et al. |
| 2017/0142082 | A1 | 5/2017 | Qian |
| 2017/0149564 | A1 * | 5/2017 | McCallum .......... G06F 21/6209 |
| 2017/0170957 | A1 * | 6/2017 | Smith .......... H04L 63/0428 |
| 2017/0364908 | A1 | 12/2017 | Smith et al. |
| 2018/0373881 | A1 | 12/2018 | Thom et al. |
| 2018/0375665 | A1 | 12/2018 | Contenti et al. |
| 2018/0375852 | A1 | 12/2018 | Thom et al. |
| 2019/0052456 | A1 * | 2/2019 | Bygrave .......... G06F 21/606 |
| 2019/0081792 | A1 | 3/2019 | Thom et al. |

FOREIGN PATENT DOCUMENTS

| | | |
|---|---|---|
| WO | 03098869 A1 | 11/2003 |
| WO | 2016172492 A1 | 10/2016 |
| WO | 2016200597 A1 | 12/2016 |

OTHER PUBLICATIONS

"Non Final Office Action Issued in U.S. Appl. No. 15/629,139", dated Jan. 31, 2019, 10 Pages.

"Non Final Office Action Issued in U.S. Appl. No. 15/629,114", dated Feb. 26, 2019, 10 Pages.

Green, Matthew, "Multiple encryption", https://blog.cryptographyengineering.com/2012/02/02/multiple-encryption/, Published on: Feb. 2, 2012, 6 pages.

Arthur et al., "A Practical Guide to TPM 2.0, Using the Trusted Platform Module in the New Age of Security", In Master Security Concepts Using TPM 2.0, Aspress Open, Originally published on Jan. 24, 2015, 375 pages.

Wang, Yingmei, "Middleware Technology Research and Interface Design Based on Internet of Things", In International Journal of Smart Home, vol. 9, No. 12, Dec. 30, 2015, pp. 35-44.

Does F-Secure KEY use double encryption to protect my KEY data?, https://community.f-secure.com/t5/F-Secure-KEY/Does-F-Secure-KEY-use-double/ta-p/80971, Retrieved on: Apr. 18, 2017, 2 pages.

"AllJoyn™ Security 2.0 Feature High-Level Design", Retrieved from: https://web.archive.org/web/20170730231028/https://allseenalliance.org/framework/documentation/learn/core/security2_0/hld, Aug. 29, 2017, 53 Pages.

"Device Pairing Kinds Enum", Retrieved from: https://docs.microsoft.com/en-us/uwp/api/windows.devices.enumeration.devicepairingkinds, Aug. 29, 2017, 2 Pages.

"OCF Security Specification V1.0.0", Retrieved from: https://openconnectivity.org/draftspecs/OCF_Security_Specification_v1.0.0.pdf, Aug. 29, 2017, 104 Pages.

"TCG Infrastructure Working Group Reference Architecture for Interoperability (Part 1)", Retrieved From: https://trustedcomputinggroup.org/wp-content/uploads/IWG_Architecture_v1_0_r1.pdf, Jun. 16, 2005, 66 Pages.

Abelson, et al., "The Risks of Key Recovery, Key Escrow, and Trusted Third-Party Encryption", In World Wide Web Journal—Special Issue: Web Security: A Matter of Trust, vol. 2, Issue 3, Jun. 1, 1997, 20 Pages.

Feller, Thomas, "Towards Trustworthy Cyber-Physical Systems", In Publication of Springer, Aug. 25, 2014, 2 Pages.

Gallery, et al., "Trusted Mobile Platforms", In Proceedings of the Foundations of Security Analysis and Design IV, Aug. 18, 2007, 43 Pages.

Hu, Fei, "Wireless Embedded Microsystems", In Publication of CRC Press, Sep. 26, 2013, 1 Page.

Konstantinou, et al., "Cyber-Physical Systems: A Security Perspective", In Proceedings of 20th IEEE European Test Symposium, May 25, 2015, 8 Pages.

"International Search Report and Written Opinion Issued in PCT Application No. PCT/US18/033578", dated Jul. 31, 2018, 12 Pages.

"International Search Report and Written Opinion Issued in PCT Application No. PCT/US18/033579", dated Jul. 24, 2018, 14 Pages.

"International Search Report and Written Opinion Issued in PCT Application No. PCT/US18/033580", dated Jul. 30, 2018, 12 Pages.

"International Search Report and Written Opinion Issued in PCT Application No. PCT/US18/033581", dated Aug. 23, 2018, 12 Pages.

"International Search Report and Written Opinion Issued in PCT Application No. PCT/US18/038868", dated Aug. 17, 2018, 12 Pages.

"Final Office Action Issued in U.S. Appl. No. 15/629,114", dated May 30, 2019, 12 Pages.

(56) References Cited

OTHER PUBLICATIONS

"Non Final Office Action Issued in U.S. Appl. No. 15/703,857", dated May 29, 2019, 13 Pages.
"Non Final Office Action Issued in U.S. Appl. No. 15/629,064", dated Apr. 18, 2019, 15 Pages.
"Non Final Office Action Issued in U.S. Appl. No. 15/629,064", dated Oct. 30, 2019, 19 Pages.
"Non Final Office Action Issued in U.S. Appl. No. 15/703,857", dated Mar. 18, 2020, 17 Pages.
"Final Office Action Issued in U.S. Appl. No. 15/629,064", dated May 13, 2020, 22 Pages.
"Final Office Action Issued in U.S. Appl. No. 15/703,857", dated Aug. 6, 2020, 18 Pages.
"Non Final Office Action Issued in U.S. Appl. No. 15/629,064", dated Dec. 24, 2020, 18 Pages.

\* cited by examiner

AUTHORIZATION KEY ESCROW

BACKGROUND

Devices are increasingly configured with sensors, electronics, and network capabilities to provide enhanced user experiences. Such devices utilize different software/firmware, applications, etc. to provide these enhanced experiences. These devices are sometimes referred to as "smart devices," "connected devices," or "Internet of Things (IoT) devices." Because the devices are configured to intercommunicate using the configured network capabilities, the devices utilize secure communication functionality provided by different types cryptographic keys.

SUMMARY

In at least one implementation, a device includes a trusted computing manager configured to access secure storage of the device and to generate a subject key managed by a policy. The policy identifies an authorized entity to receive the subject key. A key secret of the device is stored in the secure storage. The device further includes an encryption entity of the trusted computing manager configured to encrypt a payload containing the subject key using the key secret to generate a key secret encrypted payload and to encrypt the key secret encrypted payload using an escrow public key associated with an escrow service to generate a multi-encrypted payload. The device further includes a payload interface communicatively connected to the trusted computing manager configured to transmit the multi-encrypted payload to the escrow service and an entity authorization interface communicatively connected to the trusted computing manager configured to communicate the key secret to the authorized entity. The key secret is usable by the authorized entity to decrypt the key secret encrypted payload to access the subject key.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

Figure 10:
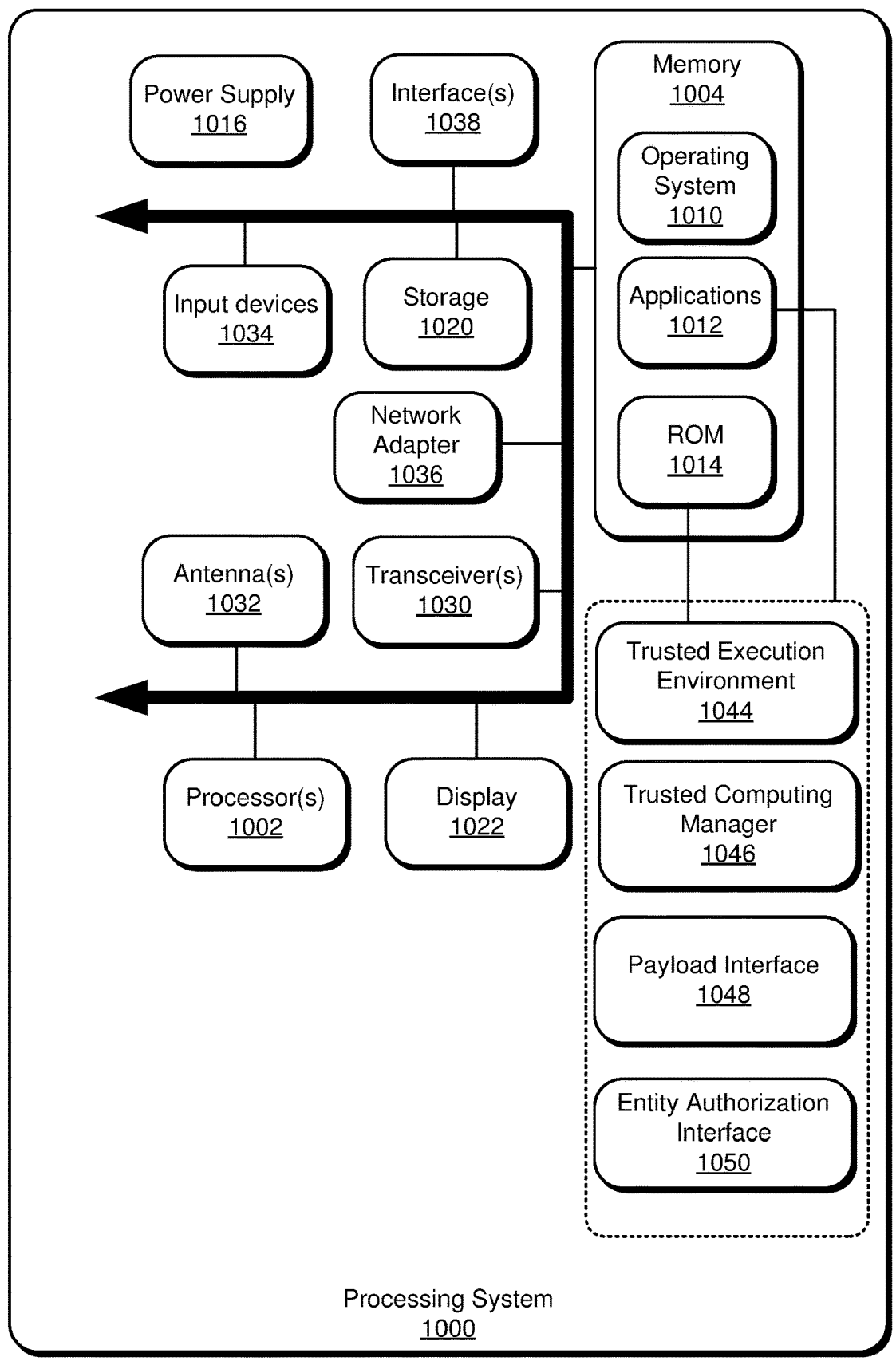

FIG. 10 an example system that may be useful in implementing the described technology.

DETAILED DESCRIPTIONS

Devices are increasingly configured with sensors, electronics, and network capabilities to provide enhanced user experiences. Such devices utilize different software/firmware, applications, etc. to provide these enhanced experiences. These devices are sometimes referred to as "smart devices," "connected devices," or "Internet of Things (IoT) devices." Because the devices are configured to intercommunicate using the configured network capabilities, the devices utilize secure communication functionality provided by different types cryptographic keys, such as encryption keys, signing keys, digital certificates, etc. Some cryptographic keys, such as encryption keys, are generated by one device or service and shared to other devices or services such that the devices may securely communicate. Malware executing on one of the devices or a bad actor may intercept a cryptographic key during transmission from one device to another device, which compromises the security of the key. Furthermore, any centralized key storage is a prime target for hackers and other actors seeking access to a key protected device.

Implementations described herein provide methodology and technology to securely transmit cryptographic keys between devices, between a device and a service, or between services. A key originating device generates a subject key that is managed by a policy. The subject key may be generated and the policy configured at the instruction of a user, an application, or a service, such as a provisioning service. The policy that manages the subject key identifies at least one entity that is authorized to receive the subject key. The policy may also identify a migration authority, such as an escrow service that is authorized to receive, store, and distribute the subject key. The subject key may be generated by a trusted platform module (TPM) and is generated based on a root secret accessible by the TPM.

The subject key is wrapped in varying layers of encryption as it is communicated between the respective parties (e.g., the key originating device, the escrow service, and the authorized device) such as to provide protection from any unauthorized actors such as a hacker or malware. The subject key is first encrypted by a key secret that is securely stored on the key originating device. The key secret may be a symmetric key. The subject key is then encrypted by a public key of the escrow service (e.g., key migration authority) designated by the policy that manages the subject key. The multi-encrypted payload is communicated to the escrow service. The escrow service securely stores the multi-encrypted payload until an authorized entity requests access to the subject key.

When an entity requests access to the subject key, the escrow service decrypts the multi-encrypted payload using a private key securely stored at the escrow service. The escrow service may then import the encrypted payload (e.g., encrypted subject key) into a TPM of the escrow service.

The escrow service then determines that the requesting entity satisfies the policies that manage the subject key. Such a determination may be based on received attestation information requested from the requesting entity. The escrow service (e.g., the TPM of the escrow service) compares the attestation information to the policies to determine whether the policies are satisfied. If the policies are satisfied by the attestation information of the requested entity, then the requesting entity is authorized. The escrow service then encrypts the encrypted payload with the public key of the authorized entity and sends the payload to the authorized entity.

The authorized entity decrypts the encrypted payload using a private key and securely stores the remaining encrypted payload. The authorized entity still does not have access to the subject key because the subject key is protected by the key secret securely stored on the originating device. The originating device may then communicate the key secret to the authorized device using various communication methods. The authorized device may then decrypt the payload and extract the subject key. Thus, the subject key is transmitted between at least three parties while remaining encrypted by at least one layer of encryption. Any bad actors that intercept one of the payloads will not be able to use the payload. Furthermore, the escrow service may store a plurality of keys, but the escrow service does not have access to the keys since they are encrypted by the originating party. Furthermore, if a hacker or other actor tries to access the escrow service storing the keys, the parties will not be able to use such keys since they are still encrypted.

These implementations provide a number of additional benefits. For example, a user has a number of smart devices in his or her home for home automation. Such devices may include a smart sprinkler system, a smart security system, a smart thermostat, etc. The user wants to provision these devices with the same encryption key such that he or she can securely communicate with or control (e.g., using a smart phone) the devices. The user can generate a key on the smart phone and identify the devices as being authorized to receive the key. The identified devices are included in a policy that manages the generated key. The key is communicated to a designated escrow service using the implementations described herein. The devices are configured to request, from the designated escrow service, the generated key. Such a configuration may be based on configuration information installed on the devices or received at the device during device provisioning. The devices are authorized and receive the key. The mobile device may then communicate the key secret to the different devices using a secure communication protocol (e.g., SSL/TLS) or an offline channel (e.g., USB or Wi-Fi).

Similarly, a device manufacturer may identify an escrow service in a device when the device is manufactured. When the device is powered on, the device is configured to contact the escrow service and request a key, which is previously generated by the manufacturer and managed by a policy that identifies the device as an authorized device. The device is authorized and the key is received. The manufacturer may then communicate the key secret to the device to unlock the key. These and other implementations are described further with respect to the figures.

Figure 1:
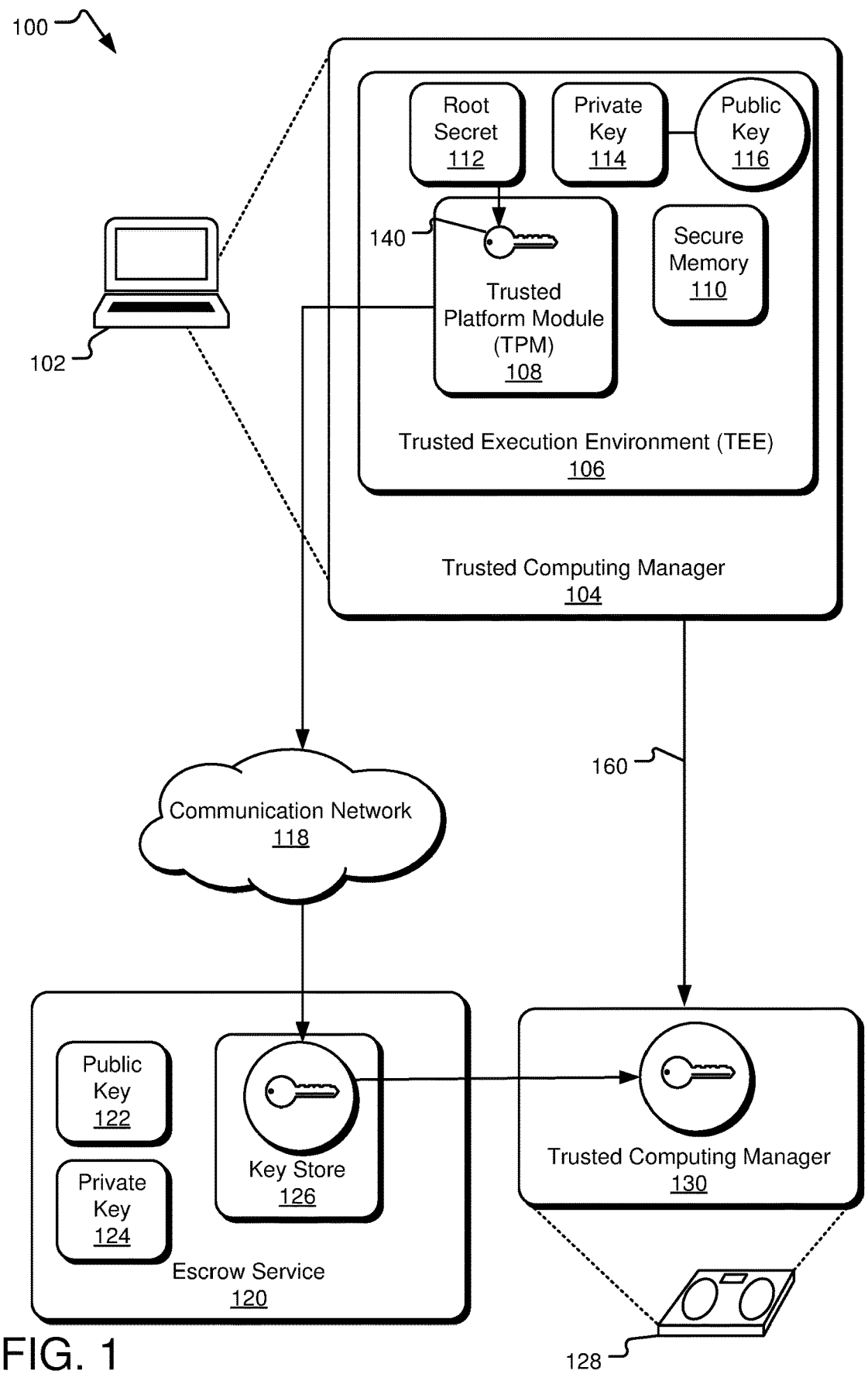
FIG. 1 illustrates an example functional block diagram for utilizing an escrow service for transferring a subject key to an authorized entity.

FIG. 1 illustrates an example functional block diagram 100 for utilizing an escrow service 120 for transferring a subject key 140 to an authorized entity. The block diagram 100 includes a device 102. In the illustrated implementation, the device 102 is a laptop, but it should be understood that the implementations described herein are applicable to a variety of devices including, without limitation, desktops, mobile phones, smart appliances (e.g., refrigerators, stoves, ovens, scales, washers, dryers, toasters, blenders, coffee makers, juicers), smart light bulbs, smart electrical plugs, entertainment systems, security systems, control systems, smart thermostats, set top boxes, etc. The implementations described herein may be used by any device/service that implements keys for cryptographic operations (e.g., encryption, signing, communication). The device 102 is configured to communicate with other devices (e.g., user devices, servers, other smart devices) through a communication network 118 which includes the internet, intranets, local area networks (LAN), wide area networks (WAN), cellular networks (e.g., 3G, 4G, LTE), etc.

The device 102 includes a trusted computing manager 104, which includes a trusted platform module 108. The TPM 108 may be a microcontroller, such as a discrete silicon component in a semiconductor package, an integrated component incorporated in one or more semiconductor packages, or the TPM 108 may be a firmware based TPM running in a TEE 106 on a general-purpose system on chip (SoC). In the illustrated implementation, the TPM 108 is a firmware based TPM executed in the TEE 106. However, it should be understood that the TPM 08 may be a microcontroller/chip executed in the trusted computing manager 104. The instructions for TEE 106 may be stored in read only memory (ROM) or write once read many memory (WORM). Furthermore, any keys may be stored in secure memory of the TPM 108 or a secure memory 110 controlled by the TEE 106 and/or the trusted computing manager 104 (e.g., a secure memory 110). Furthermore, the secure memory 110 includes one or more platform configuration registers (PCRs) stored in the TPM 108. It should be understood that the trusted computing manager 104 encompasses the TEE 106 that executes the TPM 108, or a chip-based TPM with its own secure memory (PCRs).

The device 102 is associated with a public key 116, which is cryptographically associated with a private key 114 (e.g., a public/private key pair). The public/private key pair may be generated by the trusted platform module 108 based on a root secret 112 securely stored in the device. The root secret 112 may be a device specific root secret that is signed by a device manufacturer (not shown). The root secret 112 provides the basis for generating keys for different purposes (e.g., symmetric encryption, signing, communication, authorization). The various keys may be generated and managed by the trusted platform module 108. In FIG. 1, the trusted platform module 108 generates a subject key 140. The subject key 140 may be an encryption key, signing key, authorization key, etc. The subject key is managed by a policy, which indicates, for example, the key's purpose (e.g., encryption) and entities that are authorized to receive the subject key 140. The policy may be configured by the device 102 or another party/device such as a certificate authority (CA).

For example, a user of the device 102 instructs the device 102 to generate the subject key 140 to be used by other devices owned by the user. The user specifies authorized entities (e.g., device identifications, email addresses associated with entities, a migration authority) to receive the subject key 140. The subject key 140 is generated in the device 102 and the policies are attached to the generated subject key 140. Such operations are generally performed by the TPM 108. An example migration authority is an escrow service 120, but it should be understood that other migration authorities are contemplated. For example, a provisioning service may be used as or employ a migration authority, which may be designated by the user. A provisioning service is a service that provisioning smart device, which includes providing software/firmware updates, user applications, serving or retrieving user data, etc. The user may also specify additional types of policies for the subject key 140. These additional types of policies may indicate, for example, without limitation, types of TPMs that are authorized to receive the subject key 140, types of devices that are authorized to use the subject key 140, device capabilities that are required for utilization of the subject key 140, devices that should not have access to the subject key 140 (e.g., based on capabilities of a device such as GPS sensing), etc.

In FIG. 1, the policy that manages the subject key 140 identifies that a device 128 is authorized to receive the subject key 140 and that the escrow service 120 is an authorized migration authority. To move the subject key 140 to the device 128, the key encrypted in various layers of encryption and communicated to the escrow service 120. The escrow service 120 is a service (e.g., server, datastore, database) that stores keys (e.g., in a key store 126), manages keys, and communicates keys to various entities. The escrow service 120 is configured to communicate keys to different entities that are authorized to receive such keys based on policies associated with the keys. The escrow service 120 includes a public/private key pair (e.g., an escrow public key 122 and an escrow private key 124). The escrow service 120 may have a TPM (not shown), for examining the policies associated with different keys. In the illustrated implementation, the escrow service is a cloud-based escrow service, but it should be understood that the escrow service 120, in some example implementations, may be a locally connected device or implemented on the device 102.

The subject key 140 is encrypted using a key secret (not shown). The key secret may be a symmetric encryption key, or in some implementations, the private key 114 associated with the public key 116. The key secret is securely stored in the device 102 (e.g., the secure memory 110) until the device 102 authorizes an authorized entity (e.g., the device 128) to use the subject key 140 by communicating the key secret to the authorized entity. The encrypted subject key is further encrypted by the escrow public key 122 to generate a multi-encrypted payload. In some example implementations, the payload includes data provisioned for the authorized entity (e.g., the device 128). Thus, the subject key 140 and data are encrypted using the key secret, which is then encrypted using the escrow public key 122 to generate the multi-encrypted payload.

The multi-encrypted payload is communicated to the escrow service 120 through the communication network 118. Because the escrow service 120 securely stores the escrow private key 124 associated with the escrow public key 122, the escrow service 120 decrypts the outer layer of the multi encrypted payload using the escrow private key 124. However, the payload is still protected (e.g., illustrated by a key secret encrypted payload 142). As such, if a bad actor seizes the key secret encrypted payload or if the key secret encrypted payload 142 is inadvertently communicated to an unauthorized party, then the subject key (and any data) is not accessible. The escrow service 120 may store the key secret encrypted payload 142 until an authorized entity requests the key secret encrypted payload or the escrow service 120 is instructed to communicate the key secret encrypted payload 142 to an authorized entity (e.g., the device 128). It should be understood that the escrow service 120 may store the key secret encrypted payload in its multi-encrypted payload form (e.g., encrypted by the escrow public key 122 of the escrow service). It should also be understood that the escrow service 120 may decrypt the multi-encrypted payload to generate the key secret encrypted payload. The escrow service 120 (e.g., in a TPM) can perform a key import under a storage key of the escrow service 120 and read and access/verify the policy of the key secret encrypted payload. The escrow service 120 may then rewrap (e.g., re-encrypt) the key secret encrypted payload using the storage key of the escrow service 120 and securely store the encrypted payload.

Before the escrow service 120 communicates the key secret encrypted payload 142 to the device 128, the escrow service 120 determines whether the requesting entity is authorized. Such a determination may include loading the key secret encrypted payload in a TPM of the escrow service 120, requesting attestation information from the device 128, receiving the attestation information, and confirming that the attestation information satisfies the policies attached to the key secret encrypted payload. If the device 128 is authorized, the escrow service 120 encrypts the key secret encrypted payload with an authorized entity public key (not shown) of the device 128 to generate a multi-encrypted payload, which is communicated to the device 128.

The device 128 securely stores an authorized entity private key (not shown). The device 128 includes a trusted computing manager 130, which may include a trusted execution environment (TEE) (not shown) and/or a trusted platform module (TPM) (not shown). The device 128 decrypts the multi-encrypted payload (using the authorized entity private key) to retrieve a key secret encrypted payload 144. The device 128 is not able to decrypt the key secret encrypted payload 144 until the device 102 communicates the key secret to the device 128. Such a communication is illustrated by an arrow 160. The key secret may be communicated to the device 128 using a secure communication channel (e.g., SSL/TLS) or an offline communication channel. The key secret may also be published publicly such that the device 128 is able to retrieve the key secret. When the device 128 has possession of the key secret, the device 128 is implicitly authorized to use the subject key 140. The device 128 uses the key secret to decrypt the key secret encrypted payload and then stores the subject key 140 in a secure location in the device 128 (e.g., in a TPM of the device 128).

Figure 2:
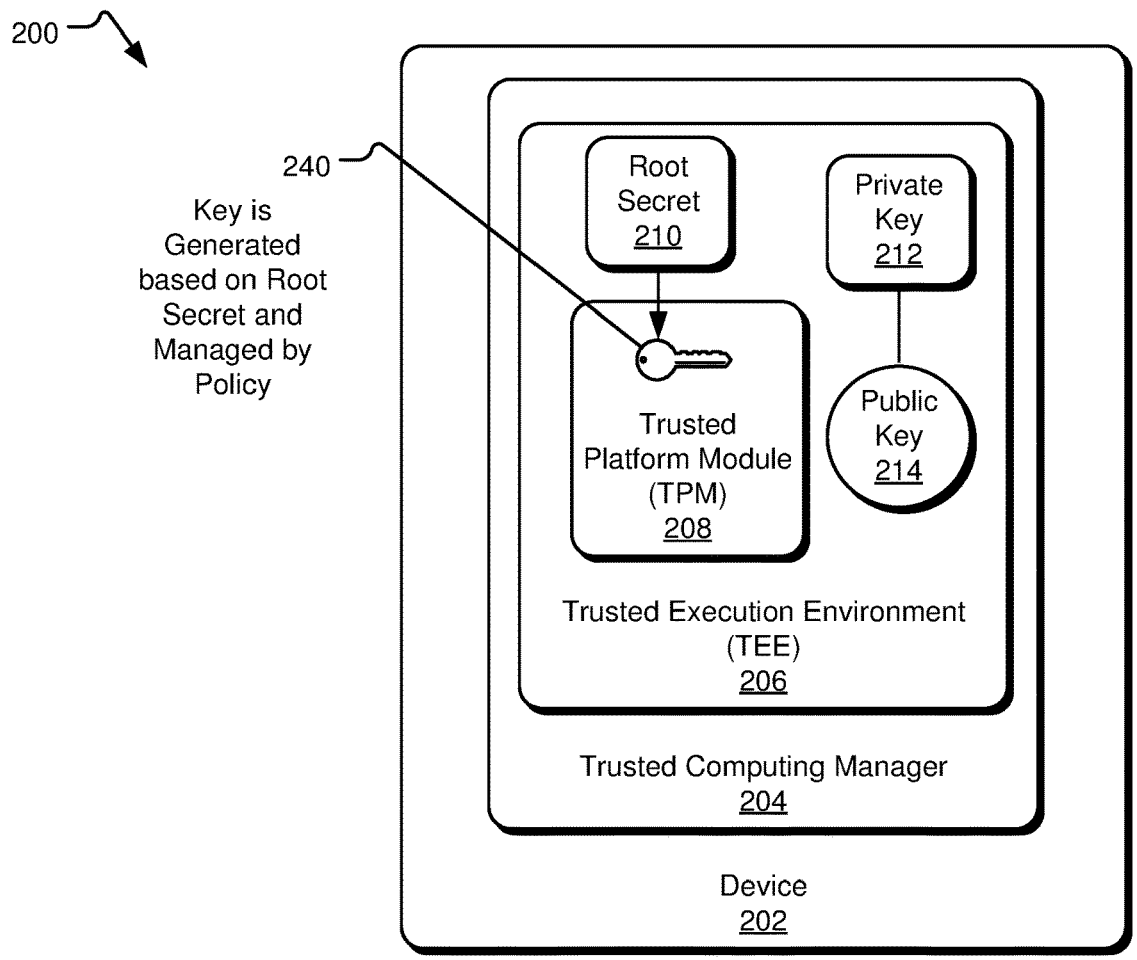
FIG. 2 illustrates another example functional block diagram for utilizing an escrow service for transferring a subject key to an authorized entity.
Figure 2:
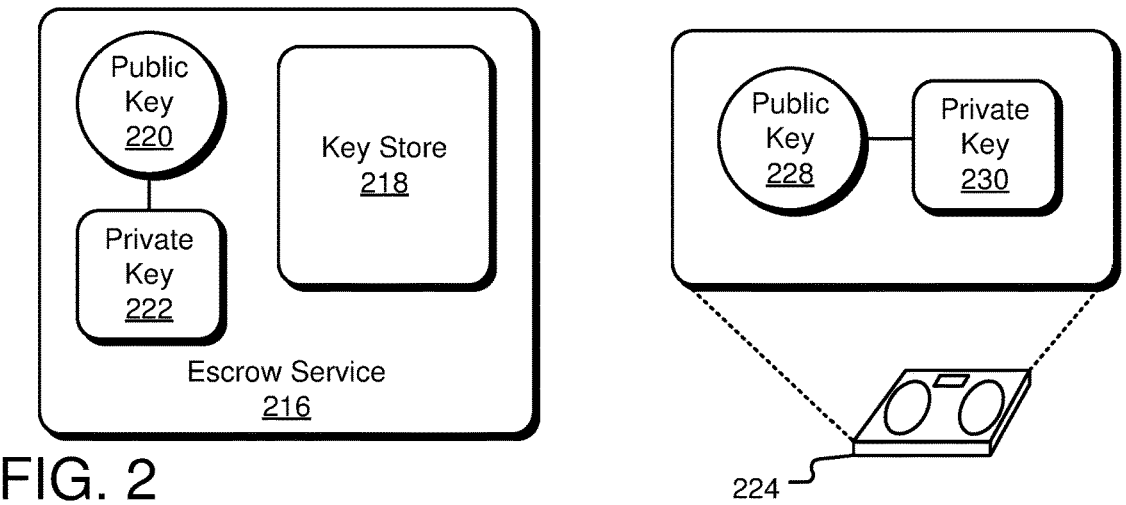

FIG. 2 illustrates another example functional block diagram 200 for utilizing an escrow service for transferring a subject key to an authorized entity. The block diagram includes a device 202, which executes a trusted execution environment (TEE) 206 including a trusted platform module (TPM) 208. In some implementations, the TPM 208 is a chip-based TPM that does not execute in the TEE 206. The device 202 generates a subject key 240, which may be used for encryption, signing, communication, etc. The subject key 240 may be generated based on a root secret 210 of the device 202 and is managed by a policy. The policy may be configured by the device 202, by the user of the device, or a certificate authority (CA) employed by another party or service (e.g., a provisioning service). The policy identifies that an authorized entity is authorized to use the subject key 240 and a migration authority that is authorized to receive the subject key 240. In FIG. 2, the authorized entity is another device 224. Instead of the communicating the subject key 240 directly to the device 224, the subject key 240 is wrapped in varying layers of encryption and communicated to the migration authority, which is an escrow service 216. The escrow service 216 may securely store the subject key in a key store 218 until the subject key is communicated to the device 224.

The subject key is wrapped (e.g., encrypted) using a key secret, which may be an asymmetric key. The subject key is further wrapped (e.g., encrypted again) using an escrow public key 220 of the escrow service 216 to generate a multi-encrypted payload. The multi-encrypted payload is communicated to the escrow service 216, which may decrypt the outer layer and store the key secret protected subject key 240 in the key store 218 until the payload is communicated to the device 224. When the escrow service 216 is instructed or when the authorized entity requests the subject key 240, the escrow service 216 determines whether the policies are satisfied by the requesting entity (e.g., using attestation and the attached policies). If the requesting entity is authorized, the escrow service 216 encrypts the payload using an authorized entity public key 228 of the device 224 to generate another multi-encrypted payload. The multi-encrypted payload is communicated to the device 224, which may then decrypt the multi-encrypted payload using an authorized entity private key 230. The payload is still protected by the key secret used initially encrypt the subject key 240. When the device 202 communicates the key secret to the device 224, the device 224 may decrypt the payload and utilize the subject key 240.

Figure 3:
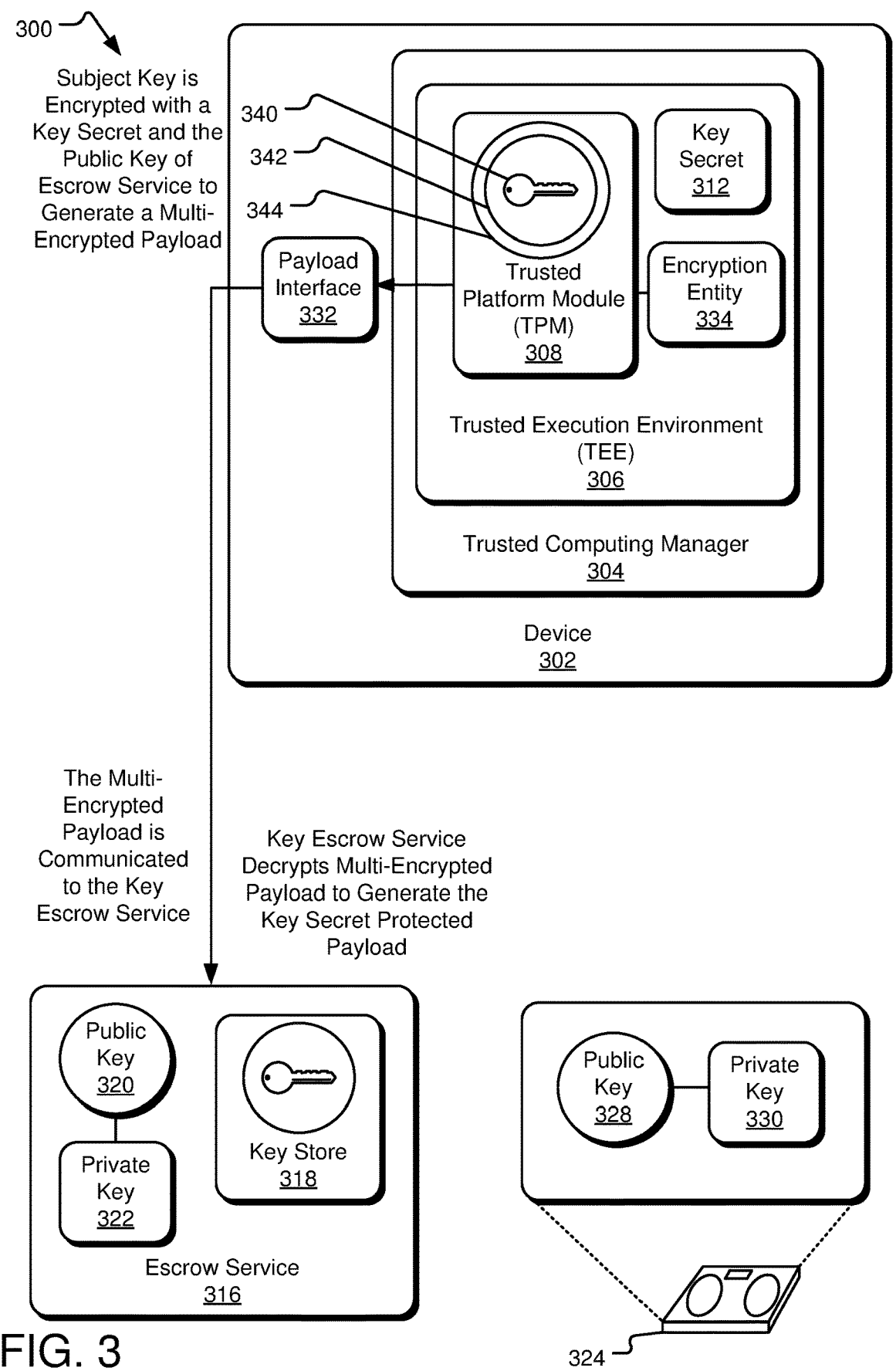
FIG. 3 illustrates another example functional block diagram for utilizing an escrow service for transferring a subject key to an authorized entity.

FIG. 3 illustrates another example functional block diagram 300 for utilizing an escrow service for transferring a subject key to an authorized entity. The block diagram includes a device 302, which executes a trusted execution environment (TEE) 306 including a trusted platform module (TPM) 308. In some implementations, the TPM 308 is a chip-based TPM that does not execute in the TEE 306. The device 302 generates a subject key 340, which may be used for encryption, signing, communication, etc. The subject key 340 may be generated based on a root secret 310 of the device 302 and is managed by a policy designated by a user or a certificate authority (CA) employed by the user or another party (e.g., a provisioning service, service provider). The policy indicates that an authorized entity is authorized to use the subject key 340 and an authorized migration authority for transmitting the subject key 340. In FIG. 3, the authorized entity is another device 324 and the migration authority is the escrow service 316. Instead of the communicating the subject key 340 directly to the device 324, the subject key 340 is wrapped in varying layers of encryption and communicated through the escrow service 316, which may securely store the subject key in a key store 318 until the subject key is communicated to the device 324. The TPM 308 has access to or includes an encryption engine 334, that performs different cryptographic operations.

The subject key is wrapped (e.g., encrypted by the encryption engine 334) using a key secret 312, which may be an asymmetric key to generate a key secret encrypted payload 342. The subject key 340 is further wrapped (e.g., encrypted again by the encryption engine 334) using an escrow key 320 of the escrow service 316 to generate a multi-encrypted payload 346. The multi-encrypted payload 346 is communicated to the escrow service 316 by a payload interface 332. The escrow service stores the multi-encrypted payload in the key store 318. In some implementations, the escrow service 316 decrypts the outer layer and stores the key secret encrypted payload 342 in the key store 318 until the payload is communicated to the device 324. When the escrow service 316 is instructed or when the authorized entity requests the subject key 340, the escrow service authorizes the receiving entity (e.g., based on the policies) and encrypts the payload using an authorized entity public key 328 of the device 324 to generate another multi-encrypted payload. The multi-encrypted payload may be communicated to the device 324, which may then decrypt the multi-encrypted payload using an authorized entity private key 330. The payload is still protected by the key secret 312 used initially encrypt the subject key 340. When the device 302 communicates the key secret 312 to the device 324, the device 324 may decrypt the payload and utilize the subject key 340.

Figure 4:
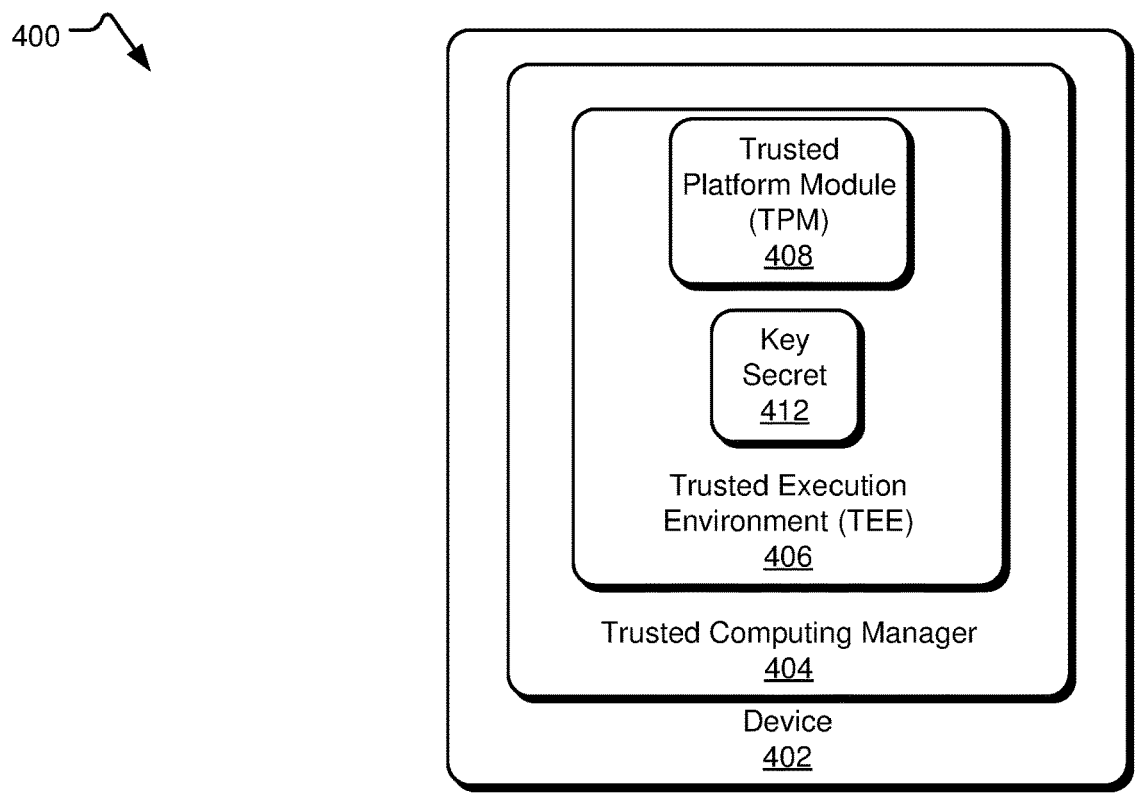
FIG. 4 illustrates another example functional block diagram for utilizing an escrow service for transferring a subject key to an authorized entity.
Figure 4:
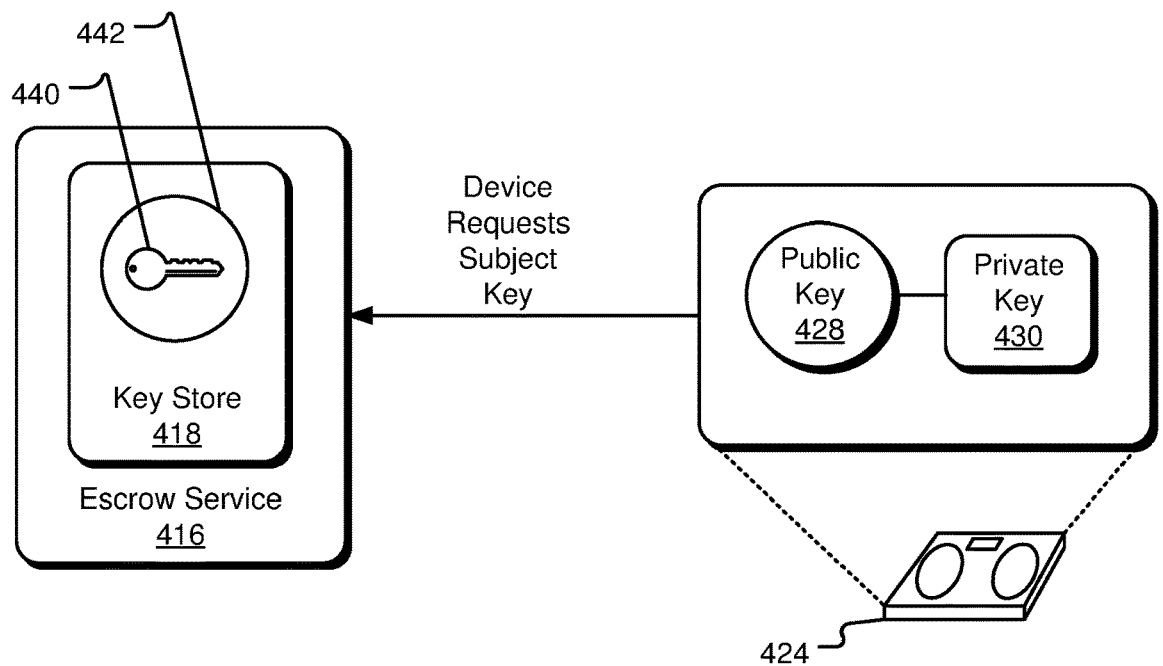

FIG. 4 illustrates another example functional block diagram 400 for utilizing an escrow service for transferring a subject key to an authorized entity. The block diagram includes a device 402, which executes a trusted execution environment (TEE) 406 including a trusted platform module (TPM) 408. In some implementations, the TPM 408 is a chip-based TPM that does not execute in the TEE 406. The device 402 generates a subject key 440, which may be used for encryption, signing, communication, etc. In some implementations, the subject key 440 is generated based on a root secret 410 of the device 402 and is managed by a policy designated by a user or a certificate authority (CA) employed by the user or another party (e.g., a provisioning service, service provider). The policy indicates that an authorized entity is authorized to use the subject key 440 and an authorized migration authority for transmitting the subject key 440. In FIG. 4, the authorized entity is another device 424 and the migration authority is the escrow service 416. Instead of the communicating the subject key 440 directly to the device 424, the subject key 440 is wrapped in varying layers of encryption and communicated through the escrow service 416, which may securely store the subject key in a key store 418 until the subject key 440 is communicated to the device 424.

The subject key 440 has been encrypted by the device 402 using a key secret 412 securely stored on the device 402 to generate a key secret encrypted payload 442. Before the key secret encrypted payload 442 was communicated to the escrow service 416, the key secret encrypted payload 442 was encrypted using an escrow public key (not shown) of the escrow service 416 to generate a multi-encrypted payload. The escrow service 416 decrypted the multi-encrypted payload using an escrow private key (not shown) associated with the escrow public key. The escrow service 416 stores the key secret encrypted payload 442 in a key store 418 of the escrow service 416 until an authorized device requests the subject key 440 or the escrow service 416 is instructed to communicate the subject key 440 to an authorized device. It should be understood that the escrow service 416 may store the key secret encrypted payload in the multi-encrypted payload form (e.g., protected by the private key of the escrow service 416). In such an implementation, the multi-encrypted payload may be imported into a TPM of the escrow service when the subject key 440 is requested by an entity. The TPM decrypts the outer layer using the private key, then checks the policies with the requesting entity. As such, the key secret encrypted payload is still protected inside the TPM of the escrow service in case the key secret is communicated by the device 402.

In FIG. 4, the authorized device is the device 424 (e.g., authorized by a policy managing the subject key 440). The device 424 requests the subject key 440 from the escrow service 416. The escrow service 416 may then determine whether the device 424 is an authorized device based on the policies associated with the subject key 440. Such a determination may include requesting attestation information from the device 424 and determining whether the attestation information satisfies the policies. If the escrow service 416 determine that the device 424 is a device authorized by the policies, then the escrow service 416 encrypts the key secret encrypted payload with a public key 428 of the device 424 to generate another multi-encrypted payload. The multi-encrypted payload is communicated to the device 424, where the device 424 decrypts the multi-encrypted payload using a private key 430 associated with the public key 428. The payload is still protected by the key secret 412 of the device 402. Thus, the device 424 is not able to use the subject key 440 until the device 424 receives the key secret 412 from the device 402.

Figure 5:
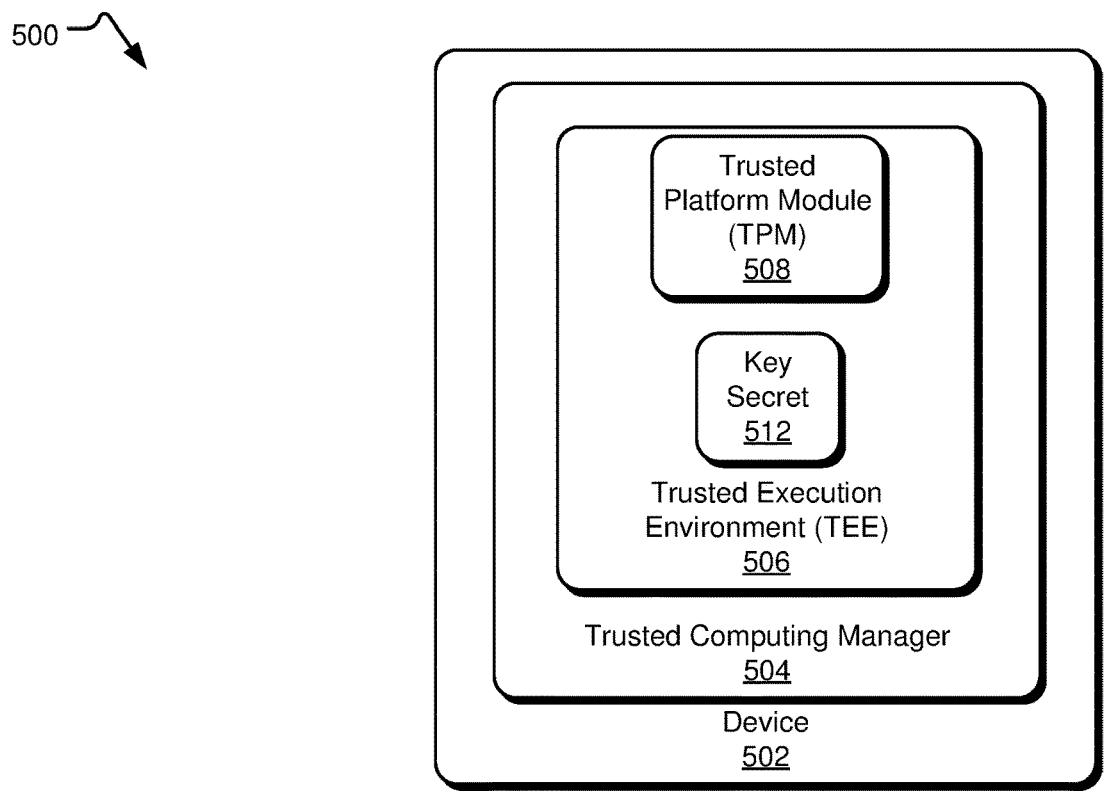
FIG. 5 illustrates another example functional block diagram for utilizing an escrow service for transferring a subject key to an authorized entity
Figure 5:
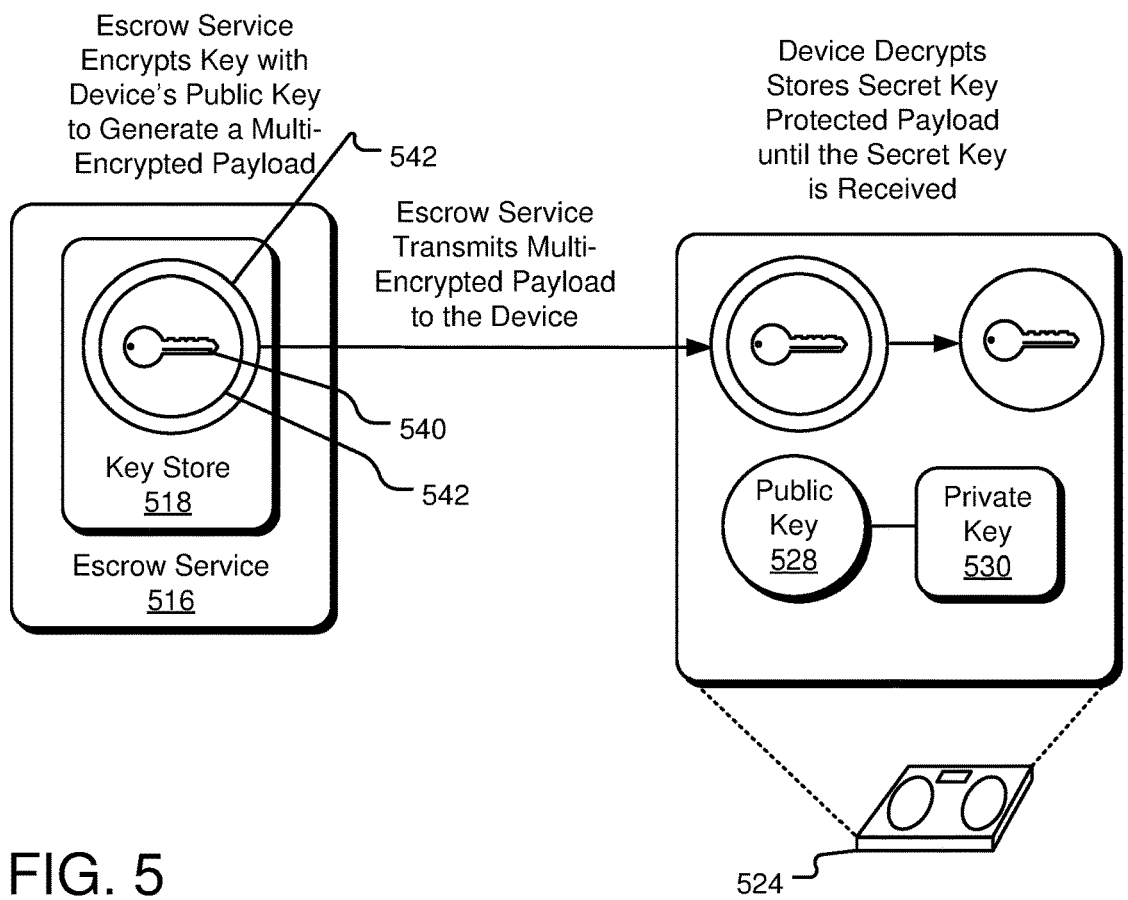

FIG. 5 illustrates another example functional block diagram 500 for utilizing an escrow service 516 for transferring a subject key to an authorized entity. The block diagram includes a device 502, which executes a trusted execution environment (TEE) 506 including a trusted platform module (TPM) 508. In some implementations, the TPM 508 is a chip-based TPM that does not execute in the TEE 506. The device 502 generates a subject key 540, which may be used for encryption, signing, communication, etc. The subject key 540 is generated based on a root secret 510 of the device 502 and is managed by a policy. The policy may be configured by the device 502 or a certificate authority (CA) employed by another party or service (e.g., a provisioning service, a content provider). The policy indicates that an authorized entity is authorized to use the subject key 540 and further identifies a migration authority for transferring the subject key 540. In FIG. 5, the authorized entity is another device 524. Instead of the communicating the subject key 540 directly to the device 524, the subject key 540 is wrapped in varying layers of encryption and communicated through the escrow service 516 (e.g., the migration authority), which may securely store the subject key in a key store 518 until the subject key is communicated to the device 524.

The subject key 540 has been encrypted by the device 502 using a key secret 512 securely stored on the device 502 to generate a key secret encrypted payload 542. Before the key secret encrypted payload 542 was communicated to the escrow service 516, the key secret was encrypted using an escrow public key (not shown) of the escrow service 516 to generate a multi-encrypted payload. The escrow service 516 received and decrypted the multi-encrypted payload using an escrow private key (not shown) associated with the escrow public key to generated the key secret encrypted payload 542. The escrow service 516 stores the key secret encrypted payload 542 in a key store 518 of the escrow service 516 until an authorized device requests the subject key 540 or the escrow service 516 is instructed to communicate the subject key 540 to an authorized device.

In FIG. 5, the authorized device is the device 524. The device 524 has requested the subject key 540 from the escrow service 516. The escrow service 516 has determined that the device 524 is an authorized device based on the policies managing the subject key 540. The escrow service encrypts the key secret encrypted payload 542 with a public key 528 of the authorized device (e.g., the device 524) to generate a multi-encrypted payload 544. The multi-encrypted payload 544 is communicated to the device 524. The device 524 decrypts the multi-encrypted payload 544 using a private key 530 associated with the public key 528. The device 524 securely stores the key secret encrypted payload 542 until the device 524 receives the key secret 512 from the device 502. When the device 524 receives the key secret from the device 502, the device 524 decrypts the key secret encrypted payload 542 and securely stores the subject key 540. The subject key 540 may then be used by the device 524 for its authorized purpose.

Figure 6:
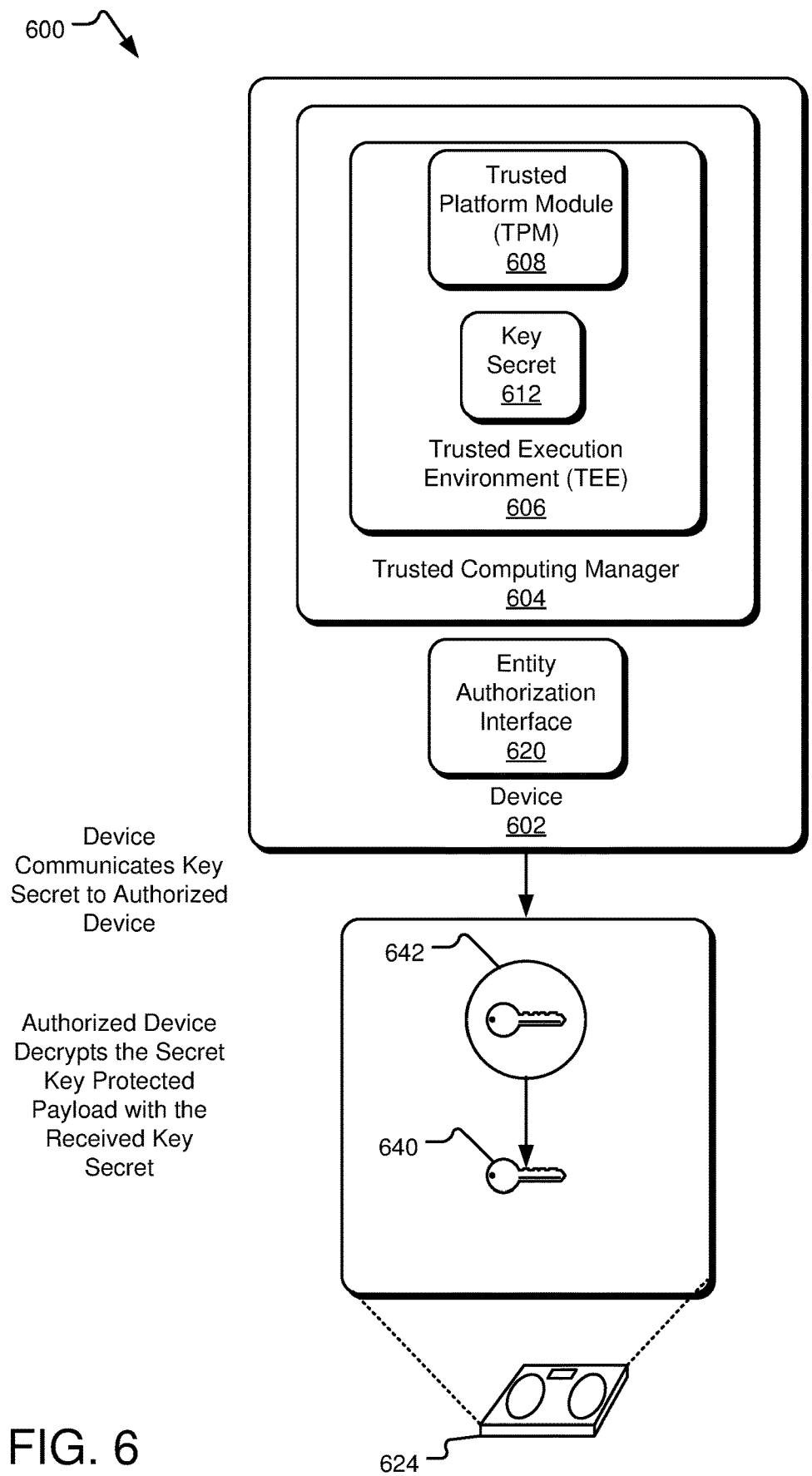
FIG. 6 illustrates another example functional block diagram for utilizing an escrow service for transferring a subject key to an authorized entity.

FIG. 6 illustrates another example functional block diagram 600 for utilizing an escrow service 616 for transferring a subject key to an authorized entity. The block diagram includes a device 602, which executes a trusted execution environment (TEE) 606 including a trusted platform module (TPM) 608. In some implementations, the TPM 608 is a chip-based TPM that does not execute in the TEE 606. The device 602 generates a subject key 640, which may be used for encryption, signing, communication, etc. The subject key 640 is generated based on a root secret 610 of the device 602 and is managed by a policy. The policy may be configured by the device 602 or a certificate authority (CA) employed by a user or another party or service (e.g., a provisioning service, a content provider). The policy indicates that an authorized entity is authorized to use the subject key 640 and an authorized migration authority (e.g., an escrow service). In FIG. 6, the authorized entity is another device 624. Instead of the communicating the subject key 640 directly to the device 624, the subject key 640 is wrapped in varying layers of encryption and communicated through an escrow service (not shown), which securely stored the subject key in a key store until the subject key was communicated to the device 624.

The subject key 640 has been encrypted by the device 602 using a key secret 612 securely stored on the device 602 to generate a key secret encrypted payload 642. Before the key secret encrypted payload 642 was communicated to the escrow service, the key secret encrypted payload was encrypted using an escrow public key (not shown) of the escrow service to generate a multi-encrypted payload. The escrow service received and decrypted the multi-encrypted payload using an escrow private key (not shown) associated with the escrow public key to generated the key secret encrypted payload. The escrow service stored the key secret encrypted payload 642 in a key store of the escrow service until an authorized device (e.g., the device 624) requested the subject key 640. The escrow service encrypted the key secret encrypted payload 642 using a public key of the device 624 to generate a multi-encrypted payload, which was communicated to the device 624. The device 624 decrypted the multi-encrypted payload using a private key and securely stored the key secret encrypted payload 642 until the key secret 612 is received from the device 602.

The device 602 communicates the key secret 612 to the device 624 (e.g., the authorized device) using an entity authorization interface 620 communicative connected to the trusted computing manager 604 of the device 602. The key secret 612 may be communicated via a secure communication channel (SSL/TLS), an offline channel, or may be published for the device 624 to retrieve. The device 624 decrypts the key secret encrypted payload 642 using the key secret 612. The subject key 640 may then be securely stored in the device 624 and used for authorized purposes. Thus, the subject key 640 has been securely transmitted between multiple entities (e.g., the device 602, an escrow service, and the device 624) with varying layers of encryption. As such, a bad actor (e.g., hacker) that intercepts any of the communications between the entities is not able to utilize the subject key 640 because it is encrypted with at least one layer of encryption.

The implementations described herein are described with respect to a "smart device" being an authorized entity. However, it should be understood that the authorized entity may be another user device (e.g., laptop, desktop, mobile phone), a service (e.g., provisioning service, content provider), server, an administrator platform, or any device or party that may need to receive a key generated by another party or device.

Figure 7:
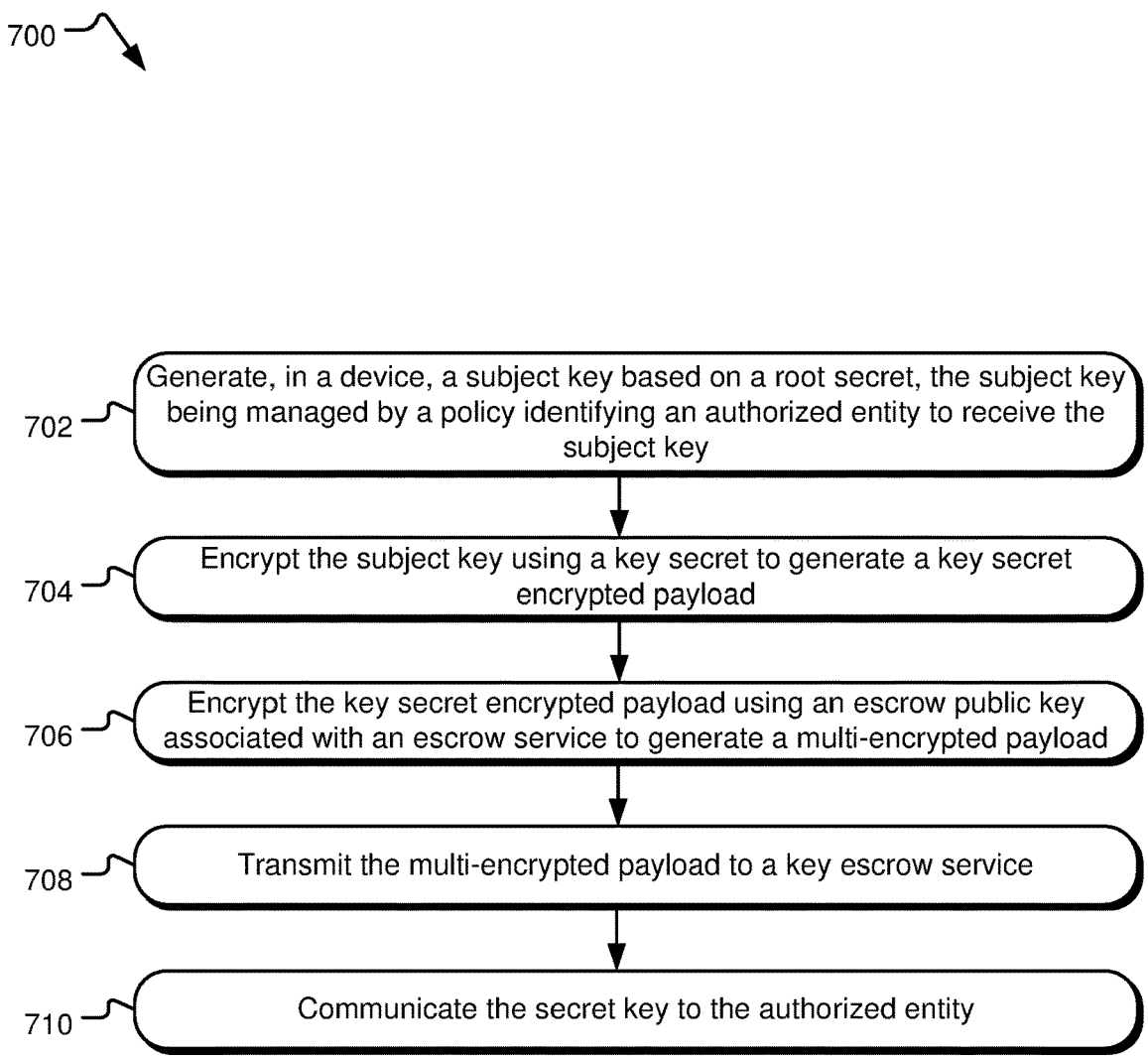
FIG. 7 illustrates example operations for utilizing an escrow service for transferring a subject key to an authorized entity.

FIG. 7 illustrates example operations 700 for utilizing an escrow service for transferring a subject key to an authorized entity. Specifically, FIG. 7 illustrates the operations 700 from the perspective of a subject key originating device. A generating operation 702 generates a subject key based on a root secret. One or more policies are attached to the subject key. The policies indicate at least an authorized entity to receive the subject key and a migration authority. The policies may be configured by a certificate authority, a user, another party, etc. An encrypting operation 704 encrypts the subject key using a key secret to generate a key secret encrypted payload. The key secret may be a symmetric encryption key or a public key of the device. An encrypting operation 706 encrypts the key secret encrypted payload using an escrow public key associated with an escrow service to generate a multi-encrypted payload.

A transmitting operation 708 transmits the multi-encrypted payload to an escrow service. The escrow service may send the key secret encrypted payload to an authorized entity using other encryption methods described herein. A communicating operation 710 communicates the key secret to the authorized entity. The key secret may be communicated via a secure connection (e.g., SSL/TSL), an offline connection, or may be published such that the authorized entity can retrieve the key secret.

Figure 8:
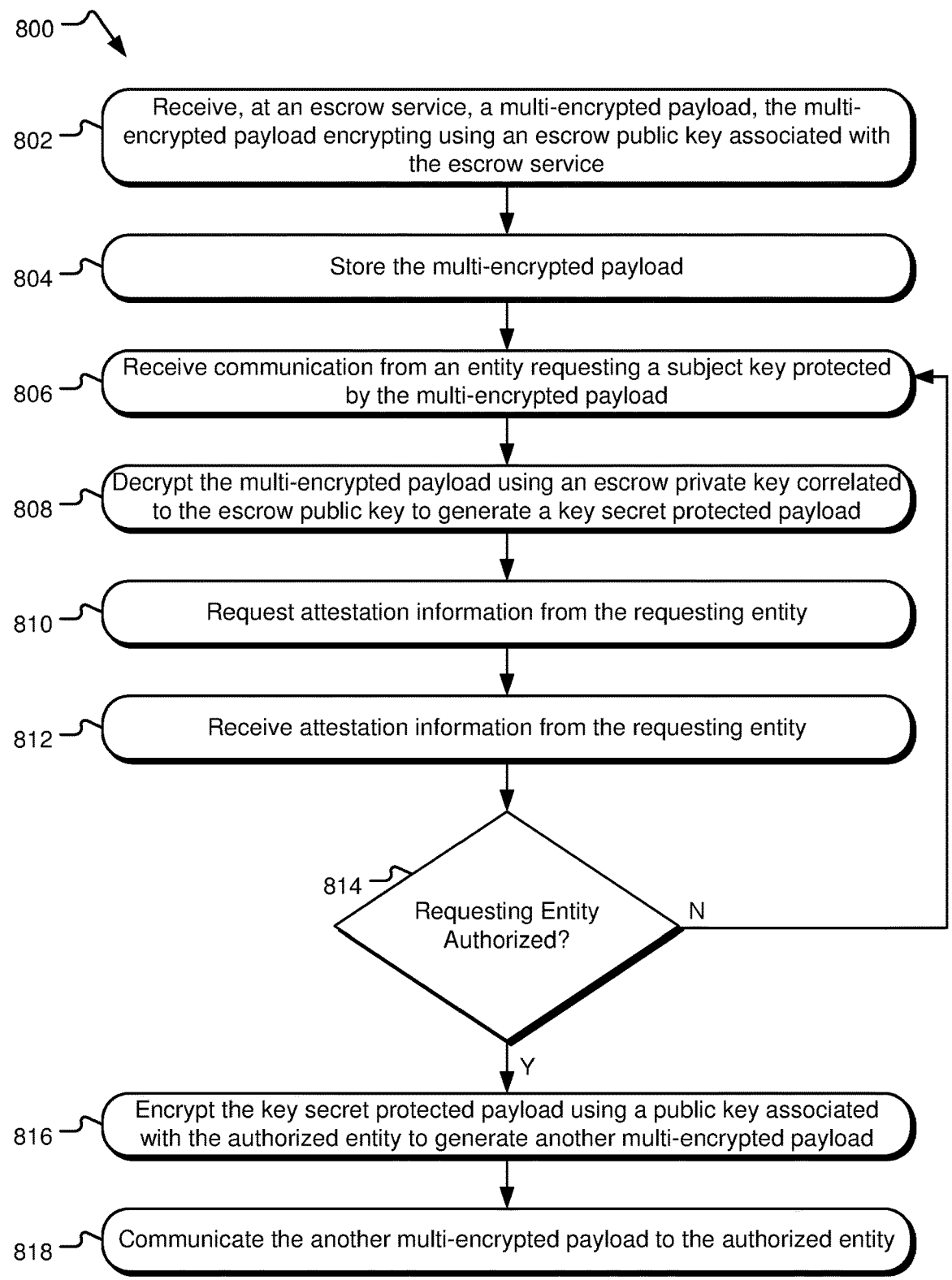
FIG. 8 illustrates example operations for utilizing an escrow service for transferring a subject key to an authorized entity.

FIG. 8 illustrates example operations 800 for utilizing an escrow service for transferring a subject key to an authorized entity. Specifically, FIG. 8 illustrates the operations 800 from the perspective from the escrow service. A receiving operation 802 receives a multi-encrypted payload. The multi-encrypted payload is encrypted using a public key associated with a private key securely stored in the escrow service. The multi-encrypted payload includes a key secret encrypted payload, which protects a subject key. The subject key is managed by a policy. The policy indicates an authorized entity to receive the payload.

A storing operation 804 stores the multi-encrypted payload until a request for the payload is received. A receiving operation 806 receives a communication from an entity requesting a subject key protected by the multi-encrypted payload. The multi-encrypted payload may then be imported to the TPM of the escrow service. A decrypting operation 808 decrypts the multi-encrypted payload using an escrow private key correlated to the escrow public key to generate a key secret encrypted payload. A requesting operation 810 requests attestation information from the requesting entity. A receiving operation 812 receives the attestation information from the attesting entity. A determining operation 814 determines whether the requesting entity is authorized. The determining operation 814 includes determining whether the attestation information satisfy the policies. For example, the attestation information may include TPM type, software version, hardware types, device identification, etc. of the requesting party. The determining operation 814 determines whether such information satisfies the policies associated with the subject key. If the policies are not satisfied, the key secret encrypted payload is exported from the TPM and securely stored.

If the policies are satisfied by the attestation information, then an encrypting operation 816 encrypts the key secret encrypted payload using a public key associated with the authorized entity to generate another multi-encrypted payload. A communicating operation 818 communicates the multi-encrypted payload to the authorized entity.

Figure 9:
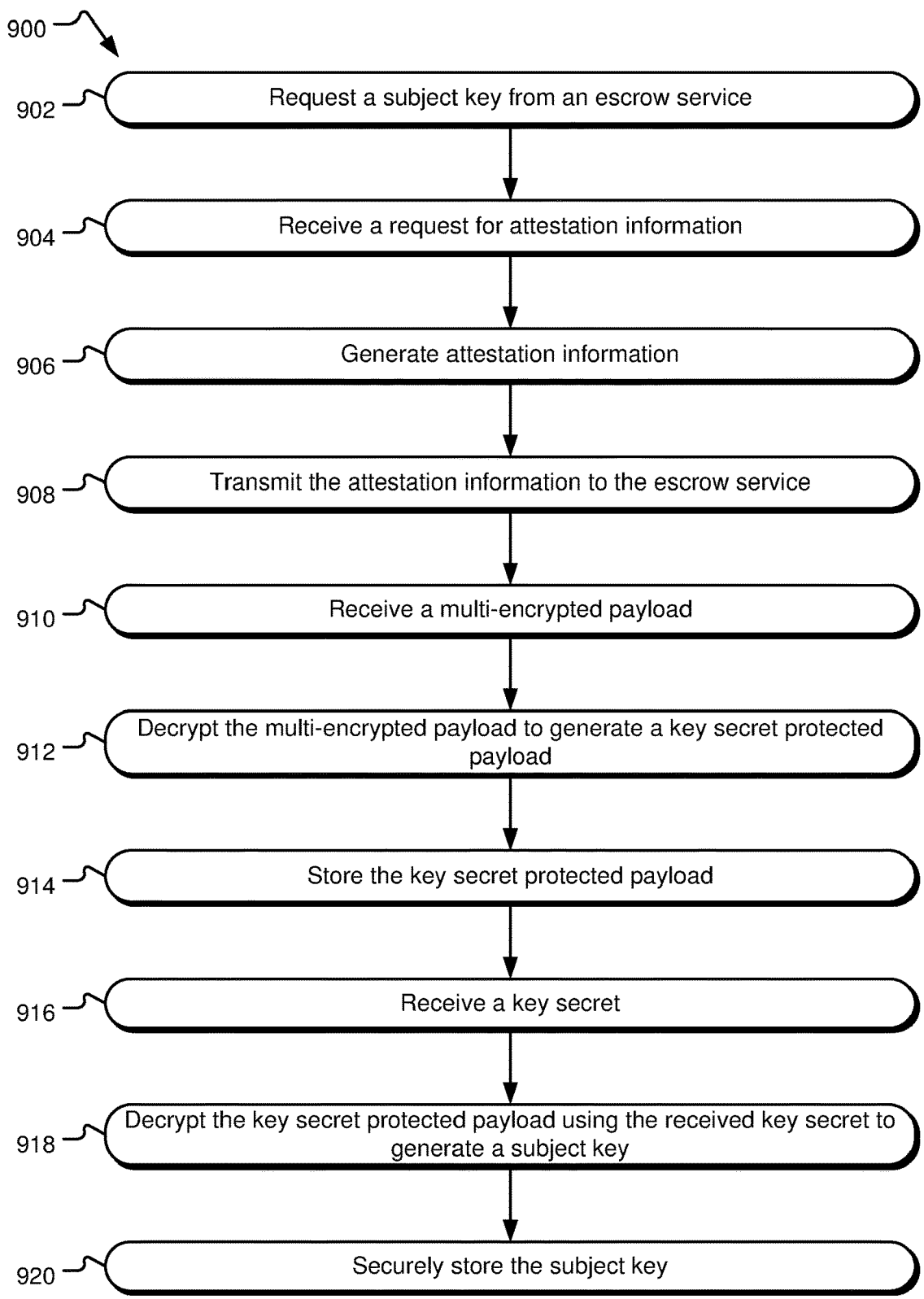
FIG. 9 illustrates example operations for utilizing an escrow service for transferring a subject key to an authorized entity.

FIG. 9 illustrates example operations 900 for utilizing an escrow service for transferring a subject key to an authorized entity. Specifically, FIG. 9 illustrates the operations 900 from the perspective of an authorized entity. A requesting operation 902 requests a subject key from an escrow service. The authorized entity may be configured to request the subject key based on provisioning information received in a configuration payload or based on information provided by a user or a content provider, depending on the implementation. A receiving operation 904 receives a request for attestation information. The receiving operation may be received from the escrow service. The request may include specific information to include in the attestation information. A generating operation 916 generates attestation information. The attestation information may be generated according to the request. The attestation information may be already generated and stored in one or more platform configuration registers (PCRs) in the TPM (e.g., a measured boot sequence).

A transmitting operation 908 transmits the attestation information to the escrow service. A receiving operation 910 receives a multi-encrypted payload, which implicitly authorizes the requesting entity. A decrypting operation 912 decrypts the multi-encrypted payload to generate a key secret encrypted payload. A storing operation 914 stores the key secret encrypted payload. The key secret encrypted payload is securely stored until the key secret is received. A receiving operation 916 receives the key secret. A decrypting operation 918 decrypts the key secret encrypted payload using the received key secret to generate the subject key. A storing operation 920 securely stores the subject key. The implementations are described with respect to the authorized entity receiving the encrypted key (e.g., payload) then receiving the key secret to decrypt the decrypted key. However, it should be understood that the authorized entity may receive the key secret before receiving the encrypted payload. In such a circumstance, the authorized entity securely stores the key secret until the encrypted key is received.

FIG. 10 illustrates an example system (labeled as a processing system 1000) that may be useful in implementing the described technology. The processing system 1000 may be a client device such as a laptop, mobile device, desktop, tablet, or a server/cloud device. The processing system 1000 includes one or more processor(s) 1002, and a memory 1004. The memory 1004 generally includes both volatile memory (e.g., RAM) and non-volatile memory (e.g., flash memory). An operating system 1010 resides in the memory 1004 and is executed by the processor 1002.

One or more application programs 1012 modules or segments, such as a trusted execution environment 1044, a trusted computing manager, 1046, a payload interface 1048, and an entity authorization interface 105 are loaded in the memory 1004 and/or storage 1020 and executed by the processor 1002. Such application programs, modules, or segments may include sub-application programs, modules, or segments such as trusted platform module, an encryption engine, etc. Data such as keys, policies, user data, seeds, etc. may be stored in the memory 1004 or storage 1020 and may be retrievable by the processor 1002 for use in the by the trusted execution environment 1044, the trusted computing manager 1046, the payload interface 1048, the entity authorization interface 1050, etc., etc. The storage 1020 may be local to the processing system 1000 or may be remote and communicatively connected to the processing system 1000 and may include another server. The storage 1020 may store resources that are requestable by client devices (not shown).

The storage 1020 may include random access memory (ROM) 1014 or write once, read many (WORM) memory, that stores processor executable instructions for the trusted execution environment 1044.

The processing system 1000 includes a power supply 1016, which is powered by one or more batteries or other power sources and which provides power to other components of the processing system 1000. The power supply 1016 may also be connected to an external power source that overrides or recharges the built-in batteries or other power sources.

The processing system 1000 may include one or more communication transceivers 1030 which may be connected to one or more antenna(s) 1032 to provide network connectivity (e.g., mobile phone network, Wi-Fi®, Bluetooth®, etc.) to one or more other servers and/or client devices (e.g., mobile devices, desktop computers, or laptop computers). The processing system 1000 may further include a network adapter 1036, which is a type of communication device. The processing system 1000 may use the network adapter 1036 and any other types of communication devices for establishing connections over a wide-area network (WAN) or local-area network (LAN). It should be appreciated that the network connections shown are exemplary and that other communications devices and means for establishing a communications link between the processing system 1000 and other devices may be used.

The processing system 1000 may include one or more input devices 1034 such that a user may enter commands and information (e.g., a keyboard or mouse). These and other input devices may be coupled to the server by one or more interfaces 1038 such as a serial port interface, parallel port, universal serial bus (USB), etc. The processing system 1000 may further include a display 1022 such as a touch screen display.

The processing system 1000 may include a variety of tangible processor-readable storage media and intangible processor-readable communication signals. Tangible processor-readable storage can be embodied by any available media that can be accessed by the processing system 1000 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1000. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example device includes one or more processors, a trusted computing manager executable by the one or more processors, an encryption entity of the trusted computing manager executable by the one or more processors, a payload interface executable by the one or more processors, and an entity authorization interface executable by the one or more processors. The trusted computing manager is configured to access secure storage of the device and to generate a subject key managed by a policy, the policy identifying an authorized entity to receive the subject key, a key secret of the device being stored in the secure storage. The encryption engine is configured to encrypt a payload containing the subject key using the key secret to generate a key secret encrypted payload and to encrypt the key secret encrypted payload using an escrow public key associated with an escrow service to generate a multi-encrypted payload. The payload interface is communicatively connected to the trusted computing manager and configured to transmit the multi-encrypted payload to the escrow service. The entity authorization interface is communicatively connected to the trusted computing manager and configured to communicate the key secret to the authorized entity, the key secret being usable by the authorized entity to decrypt the key secret encrypted payload to access the subject key.

Another example device of any preceding device includes the escrow service decrypting the multi-encrypted payload using an escrow private key associated with the escrow public key, the escrow service further storing the key secret encrypted payload until a request for the subject key is received from the authorized entity.

Another example device of any preceding device includes the escrow service storing the multi-encrypted payload until a request for the subject key is received from the authorized entity, the escrow service being configured to determine whether the authorized entity is the authorized entity based on the policy and transmit the key secret encrypted payload to the authorized entity responsive to determining that the authorized entity is authorized.

Another example device of any preceding device includes a request for the key secret being received from the authorized entity to communicating the key secret to the authorized entity.

Another example device of any preceding device includes the policy being configured by a trusted platform module (TPM) of the trusted computing manager of the device. The trusted platform module is executable by the one or more processors.

Another example device of any preceding device includes the escrow service being an authorized migration authority identified by the policy.

Another example device of any preceding device includes the key secret encrypted payload being received by the authorized entity from the escrow service.

An example method includes encrypting, on a device, a payload containing a subject key to generate a key secret encrypted payload, the payload encrypted using a key secret and managed by a policy identifying an authorized entity to receive the key secret encrypted payload, the key secret being securely stored in the device. The method further includes encrypting, on the device, the key secret encrypted payload using an escrow public key associated with an escrow service to generate a multi-encrypted payload. The method further includes transmitting, from the device, the multi-encrypted payload to the escrow service, and communicating, from the device, the key secret to the authorized entity, the key secret being usable by the authorized entity to decrypt the key secret encrypted payload to access the subject key.

Another example method of any preceding method includes the escrow service decrypting the multi-encrypted payload using an escrow private key associated with the escrow public key, the escrow service further storing the key secret encrypted payload until a request for the subject key is received from the authorized entity.

Another example method of any preceding method includes the escrow service storing the multi-encrypted payload until a request for the subject key is received from the authorized entity, the escrow service being configured to determine whether the authorized entity is the authorized entity based on the policy and transmit the key secret encrypted payload to the authorized entity responsive to determining that the authorized entity is authorized.

Another example method of any preceding method further includes receiving, at the device a request for the key secret from the authorized entity prior to communicating the key secret to the authorized entity.

Another example method of any preceding method includes the policy being configured by a trusted platform module (TPM) of the device.

Another example method of any preceding method includes the escrow service is an authorized migration authority identified by the policy.

Another example method of any preceding method includes the key secret being communicated to the authorized entity via an offline communication channel.

An example system includes means for encrypting, on a device, a payload containing a subject key to generate a key secret encrypted payload, the payload encrypted using a key secret and managed by a policy identifying an authorized entity to receive the key secret encrypted payload, the key secret being securely stored in the device, means for encrypting, on the device, the key secret encrypted payload using an escrow public key associated with an escrow service to generate a multi-encrypted payload, means for transmitting, from the device, the multi-encrypted payload to the escrow service, and means for communicating, from the device, the key secret to the authorized entity, the key secret being usable by the authorized entity to decrypt the key secret encrypted payload to access the subject key.

Another example system of any preceding system further includes means for the escrow service decrypting the multi-encrypted payload using an escrow private key associated with the escrow public key, the escrow service further including means for storing the key secret encrypted payload until a request for the subject key is received from the authorized entity.

Another example system of any preceding system further includes means for the escrow service storing the multi-encrypted payload until a request for the subject key is received from the authorized entity, the escrow service being configured to determine whether the authorized entity is the authorized entity based on the policy and transmit the key secret encrypted payload to the authorized entity responsive to determining that the authorized entity is authorized.

Another example system of any preceding system further includes means for a receiving, at the device a request for the key secret from the authorized entity prior to communicating the key secret to the authorized entity.

Another example system of any preceding system further includes means for the policy being configured by a trusted platform module (TPM) of the trusted computing manager of the device.

Another example system of any preceding system further includes means for the escrow service being an authorized migration authority identified by the policy.

Another example system of any preceding system further includes means for the key secret being communicated to the authorized entity via an offline communication channel.

An example one or more tangible processor-readable storage media embodied with instructions for executing on one or more processors and circuits of a device a process includes encrypting, on the device, a payload containing a subject key to generate a key secret encrypted payload, the payload encrypted using a key secret and managed by a policy identifying an authorized entity to receive the key secret encrypted payload, the authorized entity being associated with an authorized entity public key, the key secret being securely stored in the device. The process further includes encrypting, on the device, the key secret encrypted payload using an escrow public key associated with an escrow service to generate a multi-encrypted payload. The process further includes transmitting, from the device, the multi-encrypted payload to the escrow service. The process further includes communicating, from the device, the key secret to the authorized entity, the key secret being usable by the authorized entity to decrypt the key secret encrypted payload to access the subject key.

Another example one or more processor-readable storage media embodied with instructions for executing on one or more processors and circuits of a device a process of any preceding process further includes the escrow service decrypts the multi-encrypted payload using an escrow private key associated with the escrow public key, the escrow service further storing the key secret encrypted payload until a request for the subject key is received from the authorized entity.

Another example one or more processor-readable storage media embodied with instructions for executing on one or more processors and circuits of a device a process of any preceding process further includes the escrow service stores the multi-encrypted payload until a request for the subject key is received from the authorized entity, the escrow service being configured to determine whether the authorized entity is the authorized entity based on the policy and transmit the key secret encrypted payload to the authorized entity responsive to determining that the authorized entity is authorized.

Another example one or more processor-readable storage media embodied with instructions for executing on one or more processors and circuits of a device a process of any preceding process further includes the policy being configured by a trusted platform module (TPM) of the device.

Another example one or more processor-readable storage media embodied with instructions for executing on one or more processors and circuits of a device a process of any preceding process further includes the escrow service is an authorized migration authority identified by the policy.

Another example one or more processor-readable storage media embodied with instructions for executing on one or more processors and circuits of a device a process of any preceding process further includes the key secret being communicated to the authorized entity via an offline communication channel.

Some embodiments may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A device comprising: one or more hardware processors; a trusted computing manager executable by the one or more processors to access secure storage of the device and to generate a subject cryptographic key managed by a policy, the policy identifying an authorized entity to receive, from the device, the subject cryptographic key; an encryption entity of the trusted computing manager executable by the one or more processors to encrypt a payload containing the subject cryptographic key using a key secret to generate a key secret encrypted payload and to encrypt the key secret encrypted payload using an escrow public key associated with an escrow service to generate a multi-encrypted payload; a payload interface executable by the one or more processors and communicatively connected to the trusted computing manager, the payload interface executable to transmit the multi-encrypted payload to the escrow service; and an entity authorization interface executable by the one or more processors and communicatively connected to the trusted computing manager, the entity authorization interface executable to send the key secret to the authorized entity separate from the multi-encrypted payload based on the policy identifying the authorized entity to receive the subject cryptographic key from the device, the key secret being usable by the authorized entity to decrypt the key secret encrypted payload to access the subject cryptographic key, wherein the key secret encrypted payload is secret encrypted payload at the escrow service.

2. The device of claim 1 wherein the escrow service decrypts the multi-encrypted payload using an escrow private key associated with the escrow public key, the escrow service further storing the key secret encrypted payload until a request for the subject cryptographic key is received from the authorized entity.

3. The device of claim 1 wherein the escrow service stores the multi-encrypted payload until a request for the subject cryptographic key is received from the authorized entity, the escrow service being configured to determine whether the authorized entity is the authorized entity based on the policy and transmit the key secret encrypted payload to the authorized entity responsive to determining that the authorized entity is authorized.

4. The device of claim 1 wherein a request for the key secret is received from the authorized entity prior to communicating the key secret to the authorized entity.

5. The device of claim 1 wherein the policy is configured by a trusted platform module (TPM) of the trusted computing manager of the device.

6. The device of claim 1 wherein the escrow service is an authorized migration authority identified by the policy.

7. A method comprising; encrypting, on a device, a payload containing a subject cryptographic key to generate a key secret encrypted payload, the payload encrypted using a key secret and managed by a policy identifying an authorized entity to receive, from the device, the key secret encrypted payload and the subject cryptographic key; encrypting, on the device, the key secret encrypted payload using an escrow public key associated with an escrow service to generate a multi-encrypted payload; transmitting, from the device, the multi-encrypted payload to the escrow service; and sending, from the device separate from the multi-encrypted payload, the key secret to the authorized entity, the key secret being usable by the authorized entity to decrypt the key secret encrypted payload to access the subject cryptographic key, wherein the key secret encrypted payload is received by the authorized entity from the escrow service without decryption of the key secret encrypted payload at the escrow service.

8. The method of claim 7 wherein the escrow service decrypts the multi-encrypted payload using an escrow private key associated with the escrow public key, the escrow service further storing the key secret encrypted payload until a request for the subject cryptographic key is received from the authorized entity.

9. The method of claim 7 wherein the escrow service stores the multi-encrypted payload until a request for the subject cryptographic key is received from the authorized entity, the escrow service being configured to determine whether the authorized entity is the authorized entity based on the policy and transmit the key secret encrypted payload to the authorized entity responsive to determining that the authorized entity is authorized.

10. The method of claim 7 further comprising:
receiving, at the device a request for the key secret from the authorized entity prior to communicating the key secret to the authorized entity.

11. The method of claim 7 wherein the policy is configured by a trusted platform module (TPM) of the device.

12. The method of claim 7 wherein the escrow service is an authorized migration authority identified by the policy.

13. The method of claim 7 wherein the key secret is communicated to the authorized entity via an offline communication channel.

14. One or more tangible processor-readable storage media device embodied with instructions for executing on one or more processors and circuits of a device a process comprising: encrypting, on the device, a payload containing a subject cryptographic key to generate a key secret encrypted payload, the payload encrypted using a key secret and managed by a policy identifying an authorized entity to receive, from the device, the key secret encrypted payload and the subject cryptographic key, the authorized entity being associated with an authorized entity public key, the key secret being securely stored in the device; encrypting, on the device, the key secret encrypted payload using an escrow public key associated with an escrow service to generate a multi-encrypted payload; transmitting, from the device, the multi-encrypted payload to the escrow service; and sending, from the device separate from the multi-encrypted payload, the key secret to the authorized entity, the key secret being usable by the authorized entity to decrypt the key secret encrypted payload to access the subject cryptographic key, wherein the key secret encrypted payload is received by the authorized entity from the escrow service without decryption of the key secret encrypted payload at the escrow service.

15. The one or more tangible processor-readable storage media device of claim 14 wherein the escrow service decrypts the multi-encrypted payload using an escrow private key associated with the escrow public key, the escrow service further storing the key secret encrypted payload until a request for the subject cryptographic key is received from the authorized entity.

16. The one or more tangible processor-readable storage media device of claim 14 wherein the escrow service stores the multi-encrypted payload until a request for the subject cryptographic key is received from the authorized entity, the escrow service being configured to determine whether the authorized entity is the authorized entity based on the policy and transmit the key secret encrypted payload to the authorized entity responsive to determining that the authorized entity is authorized.

17. The one or more tangible processor-readable storage media device of claim 14 wherein the policy is configured by a trusted platform module (TPM) of the device.

18. The one or more tangible processor-readable storage media device of claim 14 wherein the escrow service is an authorized migration authority identified by the policy.

19. The one or more tangible processor-readable storage media device of claim 14 wherein the key secret is communicated to the authorized entity via an offline communication channel.

20. The device of claim 1, wherein the policy is configured by at least one of the device or a certificate authority to indicate a purpose of the subject cryptographic key and entities that are authorized to receive the subject cryptographic key.

21. The method of claim 7, wherein the policy is configured by at least one of the device or a certificate authority to indicate a purpose of the subject cryptographic key and entities that are authorized to receive the subject cryptographic key.

22. The one or more tangible processor-readable storage media device of claim 14, wherein the policy is configured by at least one of the device or a certificate authority to indicate a purpose of the subject cryptographic key and entities that are authorized to receive the subject cryptographic key.

* * * * *